Figure 1:
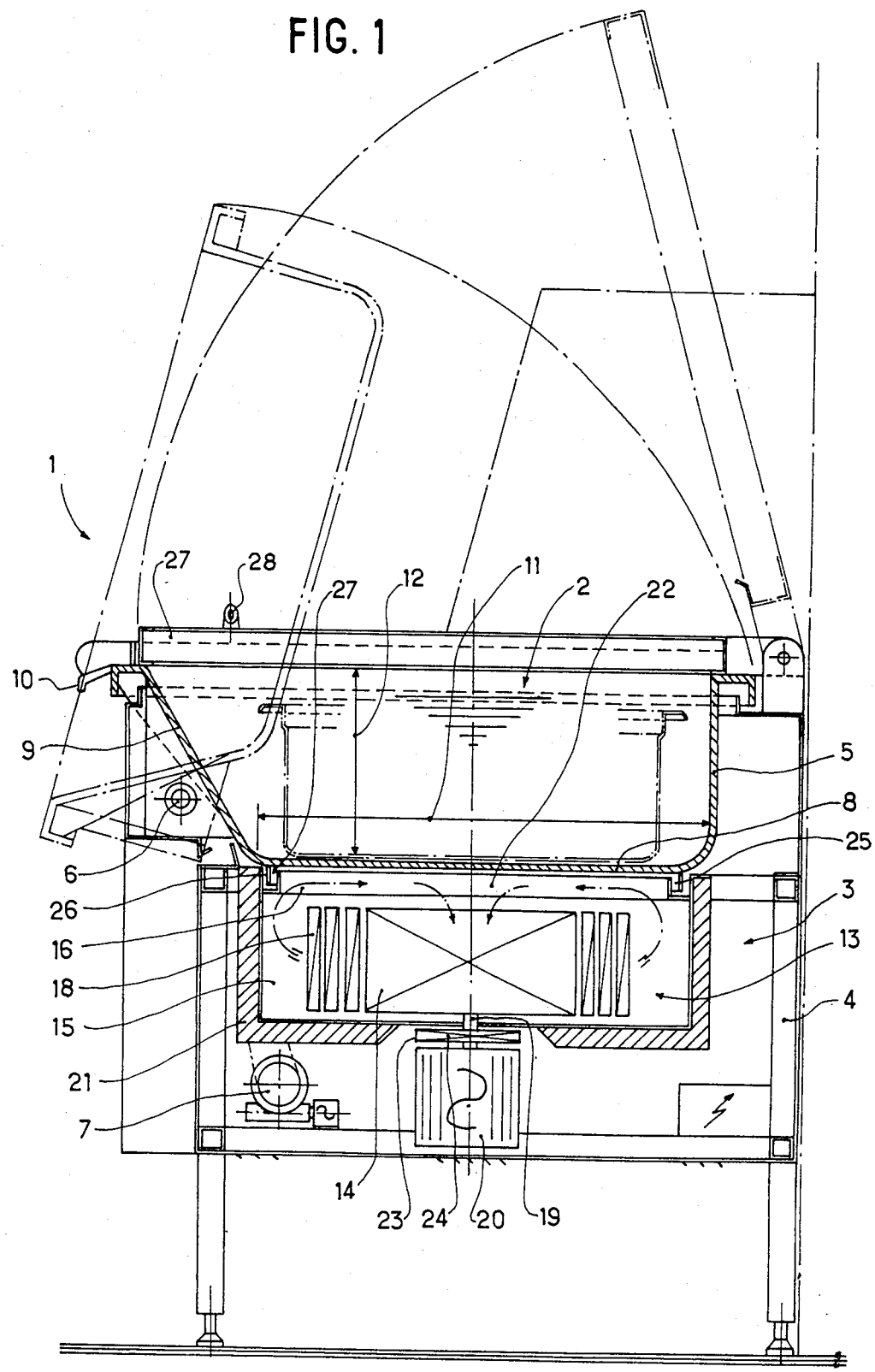

United States Patent [19]

Fritsch et al.

[11] Patent Number: 4,724,825
[45] Date of Patent: Feb. 16, 1988

[54] COMBINED COOKING MACHINE

[75] Inventors: Edgar Fritsch, Pfastatt; Norbert Fritsch, Sausheim, both of France

[73] Assignee: R. Fritsch S.A., Wittenheim, France

[21] Appl. No.: 877,323

[22] Filed: Jun. 23, 1986

[30] Foreign Application Priority Data

Jun. 28, 1985 [FR] France ............................. 85 10047

[51] Int. Cl.⁴ .............................................. F24B 9/00
[52] U.S. Cl. ................................... 126/357; 126/373; 126/390; 99/359; 99/403; 219/369; 219/460; 219/433
[58] Field of Search ............. 126/357, 390, 373, 37 B; 219/432, 433, 436, 438, 369, 370, 400, 462, 460; 99/359, 409, 451; 122/4 A

[56] References Cited

U.S. PATENT DOCUMENTS

| | | | |
|---|---|---|---|
| 2,531,237 | 11/1950 | Steinberg | 126/390 X |
| 3,167,638 | 1/1965 | Hornaday, Jr. et al. | 219/368 |
| 3,368,062 | 2/1968 | Gramenius et al. | 219/414 X |
| 3,632,980 | 1/1972 | Hornaday, Jr. et al. | 219/368 X |
| 3,682,664 | 8/1972 | Bennett | 126/369 X |
| 4,132,216 | 1/1979 | Guibert | 99/359 X |
| 4,343,292 | 8/1982 | Kells et al. | 126/390 X |

FOREIGN PATENT DOCUMENTS

| | | | |
|---|---|---|---|
| 154892 | 9/1903 | Fed. Rep. of Germany | 126/357 |
| 543823 | 1/1932 | Fed. Rep. of Germany | |
| 60271 | 7/1912 | Switzerland | 126/357 |

Primary Examiner—Randall L. Green
Attorney, Agent, or Firm—Emmanuel J. Lobato; Robert E. Burns

[57] ABSTRACT

This combined cooking machine or range, notably for professional use in communities or the like comprises a container in the form of a tilting-vat hingedly mounted in a frame structure, for use as a saucepan, a frying-pan or a deep-fryer, as required by the particular kind of food to be prepared, this container overlying means for indirectly heating the contents, notably by forced-circulation hot-air produced in a lagged heating chamber encompassing a blade turbine, cooperating baffle means being provided on the bottom of the vat and in the upper portion of the heating chamber for concentrating the heat towards the bottom.

1 Claim, 1 Drawing Figure

COMBINED COOKING MACHINE

BACKGROUND OF THE INVENTION

Field of the Invention

The present invention relates to a cooking apparatus, or combined cooking machine, notably for professional use in collective kitchens In the present state of the art, three main types of professional cooking utensils are used mainly in communities or restaurant kitchens. These utensils are essentially saucepans, or cookers, frying-pans and deep fryers.

These various types of utensils are mostly used as a function of the specific nature of the food to be cooked. Thus, saucepans are implemented primarily for boiling, frying-pans for all types of oil frying, and deep fryers for cooking food in predetermined amounts of oil or fat.

Various inconveniences are observed in the use of the above-mentioned cooking utensils and according to the present state of the cooking art.

In fact, the use of three different types of cooking utensils leads in most cases to an unnecessary and excessive cluttering of collective kitchens, considering the fact that only a few utensils are used simultaneously, and that some of them are used only episodically.

Moreover, in the present state of the art, each one of the above-mentioned cooking utensils is characterised by a number of inherent inconveniences. Thus, saucepans for boiling food, as hitherto known in community kitchens, consist mostly of a relatively deep container, compared with its horizontal cross-section. Thus, difficulties are usually experienced when cleaning these large saucepans. Moreover, to facilitate the cleaning, washing and emptying of relatively large saucepans these are connected through their bottom to draining conduits prone to frequent cloggings, or to open undesiredly and thus allow the contents to escape.

Furthermore, in most instances saucepans and deep fryers are laid directly on heating elements brought to relatively high temperatures. As a result, the food tends to adhere strongly to the bottom of these utensils and to be spoiled due to excessive burning. Thus, saucepans and deep-fryers as now in current use, notably in collective or community kitchens, are scarcely suited for preparing fragile dishes such as milk foods, unless a double saucepan or like device is used for preventing the food from burning and adhering strongly to the bottom, however at the cost of a loss of energy and/or cooking efficiency.

Considering modern deep-fryers of the type now in general use in collective or community kitchens, these utensils comprise in most cases a frusto-conical section at their base, according to the so-called 'cold area' principle. Under these conditions, the oil is heated directly to a high temperature notably by means of electric resistances and is therefore rapidly spoiled, thus building up eventually in the cold or decantation area a particularly noxious deposit consisting of carbonised oil and fried food particles.

SUMMARY OF THE INVENTION

It is therefore the primary object of the present invention to provide a combined cooking machine or range which can be used at will for boiling, cooking in oil or fat, of frying, various types of food materials, while permitting a considerably more hygienic operation than hitherto afforded when using current professional kitchen utensils.

It is another object of the present invention to provide a combined cooking machine or range intended notably for communities, which eliminates the above-mentioned inconveniences, i.e. permits of raising rapidly and uniformly the cooking temperature without causing the food to adhere to the heating surfaces, while providing a satisfactory energetic efficiency.

Another object of the combined cooking machine of the present invention is to permit the preparation of dishes, even delicate or fragile dishes such as milk-base dishes, without resorting to the conventional double saucepan method.

For this purpose, the present invention provides a combined cooking machine or range notably for professional use in community kitchens or the like, characterised in that it comprises a container or vat suitable for use as a saucepan, a frying-pan or a deep-fryer, said container overlying means for indirectly heating the contents of the combined cooking machine or range.

Other objects and advantages of the present invention will appear as the following description proceeds with reference to the attached drawing.

THE DRAWING

FIG. 1 is an elevational and sectional view of the combined cooking machine or range according to the present invention.

Referring to FIG. 1 of the drawing, the combined cooking machine or range according to the present invention comprises essentially a container or vat 2 adapted to receive the food to be cooked, and a heating device 3 arranged below this container 2, the assembly being mounted in a conventional manner in a frame structure 4.

According to the present invention, the container 2 adapted for use according to each specific case as a saucepan, a frying-pan or a deep-fryer consists of a tilting vat 5 pivotally mounted about a pivot axis 6. According to a preferred form of embodiment of the invention, this pivot axis consists of a horizontal shaft adapted to be rotated either manually or through any suitable and known power means, such as a motor and reduction unit 7, to permit the emptying of the vat 5 by tilting same upwardly, as shown in phantom lines in FIG. 1.

Thus, the access to the inner space of the tilting vat 5 for draining or cleaning purposes is greatly facilitated without resorting to the coupling of a draining hose or pipe to the vat bottom, as currently observed in cooking utensils according to the present state of the art.

Moreover, the combined cooking machine 1 according to the present invention can be used in many different ways, notably as a deep-fryer, a saucepan or a frying-pan.

For this purpose, according to a preferred form of embodiment of the invention, the tilting vat 5 has a substantially cylindrical configuration with a flat bottom 8 and an outflared front portion 9 merging into a spout 10.

To ensure an efficient heat exchange with the heating device 3, whatever the mode of operation contemplated, the diameter 11 of the flat bottom of the tilting vat 5 is considerably greater than the height 12 thereof, thus facilitating the easy access to the contents of the tilting vat 5.

However, this feature is not sufficient per se for imparting to the combined cooking machine 1 of this invention the possibility of using it at will as a frying-pan, a saucepan or a deep-fryer.

In fact, a conventional heating system comprising burners or heating resistances of the well-known types used in conventional kitchen ranges and associated with the tilting vat 5 of the present invention would not avoid the inconveniences deriving from the sticking of food, nor the spoiling of oil during the use of the utensil as a fryer. Therefore, conventional heating means as currently used in professional kitchens in combination with the tilting vat 5 of the present invention would not permit of fulfilling completely the above-mentioned objects if this invention.

In view of the foregoing, the heating system 3 of the combined cooking machine 1 of the present invention consists preferably of a forced-flow or forced-circulation indirect air-heating system 13. More particularly, the forced air flow indirect air-heating system is associated with heating means operating with any suitable fuel.

The forced-flow indirect heating system 13 comprises notably a blade turbine 14 for stirring the air circulating in a heating chamber 15 located beneath the tilting vat 5 in order to produce a forced air flow 16 having a substantially constant or uniform temperature.

This forced-circulation air is heated by using any suitable means, preferably in the form of electric heating resistances 18 surrounding the blade turbine 14 so as to heat the circulation air in heating chamber 15 up to a temperature of the order of 200 to 300 degrees centigrade.

The blade turbine 14 is rotatably driven by a motor 20 via a shaft 19.

Of course, some lagging is provided around the heating chamber 15 to avoid losses of heat by contact with the surrounding atmosphere and convey the heat available only towards the bottom 8 of tilting vat 5.

For this purpose, the heating chamber 15 is lagged with a suitable heat insulating material 21 such as glass-wool or the like, except at its open upper portion 22 opening directly against the bottom 8 of the tilting vat 5 and at its lower portion 23 corresponding to the passage of the drive shaft 19 coupled to said motor 20.

In this respect, it will be seen that said drive shaft 19 is provided preferably with a cooling fan 24 so as to cool the shaft 19 and prevent the heat generated in heating chamber 15 from overheating the motor 20.

The upper portion 22 of heating member 15 which opens on the bottom of tilting vat 5 is provided with a peripheral cylindrical upstanding collar 25 forming with an external peripheral concentric collar 26 projecting downwards from the bottom of tilting vat 5 a baffle 27 in order to ensure a reliable heat insulation between the heating chamber 15 and the bottom 8 of tilting vat 5.

Of course, the equipment of the combined cooking machine or range 1 according to the present invention is advantageously completed on the one hand by a hingedly mounted cover 28 attached to the tilting vat 5 so as to close it during the cooking process, and on the other hand by a flexible and retractable water supply conduit or hose 29, on order to prevent any possible water leakage in said tilting vat 29, notably when the machine is operated as a frying-pan.

Considering the above-described features, the combined cooking range 1 of the present invention is advantageous notably on account of its compactness and flexibility of use, another appreciable feature being of course the cooking or frying of food under very satisfactory conditions as far as efficiency and a constant hygiene are concerned.

Moreover, the use of indirect heating means comprising the forced-airflow indirect heating system 13 permits of increasing the temperature very rapidly and particularly uniformly, without creating any detrimental overheat spots or sticking of the food to the walls of the cooking vat.

Thus, considering the large heat-exchange area of the single-walled bottom 8, the combined cooking vat 1 according to the present invention permits of avoiding the use of double saucepans, even when cooking the most fragile foods.

Finally, when the cooker of the present invention is used as a deep-fryer, any 'cold areas' or developing of carbonised waste food particles in oil are safely eliminated.

Though the present invention has been described and illustrated with specific reference to a particular form of embodiment, it will readily occur to those conversant with the art that various modifications and changes may be brought to the shapes, materials and combination of means mentioned hereinabove without departing however from the basic principle of the invention.

What is claimed as new is:

1. A multi-use cooking apparatus comprising, a mount, a tiltable cooking vat mounted on said mount for boiling, cooking in oil or fat and frying of food materials, the vat having closed bottom and top opening, means for defining an insulated heating component mounted directly below the vat and open at the top, pivot means pivotally mounting said vat for selective positioning thereof to a tilted position relative to the mount and to a lowered cooking position in which the bottom of the vat covers the open top of the heating compartment closing it and said bottom is in direct communication with the interior of said compartment, heating means in the compartment for heating air in the compartment, means for forced circulation of heated air in the compartment to directly heat substantially uniformly the bottom of the vat with hot air when disposed in said cooking position and the vat bottom closes the open top of the heating compartment, a baffle seal for sealing the bottom of the vat and heating compartment comprising a downwardly extending flange on the bottom of the vat, and said heating compartment having externally thereof adjacent the open top a channel into which said flange extends downwardly when the vat is in said lowered cooking position, whereby the flange and channel define said baffle seal for retaining hot air from leaking between the heating compartment and the vat bottom seated thereon.

* * * * *